(12) United States Patent
Yen et al.

(10) Patent No.: US 10,763,056 B2
(45) Date of Patent: Sep. 1, 2020

(54) BACKLIT KEY STRUCTURE BOTTOM PLATE WITH SEPARATELY FORMED PROTRUSIONS

(71) Applicants: LITE-ON ELECTRONICS (GUANGZHOU) LIMITED, Guangzhou (CN); Lite-On Technology Corporation, Taipei (TW)

(72) Inventors: Ming-Fu Yen, Taipei (TW); Hsiang-Sheng Chuang, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/358,733

(22) Filed: Mar. 20, 2019

(65) Prior Publication Data
US 2019/0318891 A1   Oct. 17, 2019

Related U.S. Application Data

(60) Provisional application No. 62/657,939, filed on Apr. 16, 2018.

(30) Foreign Application Priority Data

Jan. 28, 2019 (CN) .......................... 2019 1 0079620

(51) Int. Cl.
*H01H 13/83* (2006.01)
*F21V 8/00* (2006.01)
(Continued)

(52) U.S. Cl.
CPC .......... *H01H 13/83* (2013.01); *G02B 6/0011* (2013.01); *G05G 1/02* (2013.01); *G05G 25/00* (2013.01);
(Continued)

(58) Field of Classification Search
CPC .... H01H 9/00; H01H 13/83; H01H 2203/052; H01H 2219/036; H01H 2219/044;
(Continued)

(56) References Cited

U.S. PATENT DOCUMENTS 8,759,698 B2 * 6/2014 Chiba .................... H01H 3/125
                                                         200/310
9,087,662 B2 * 7/2015 Chen ...................... H01H 13/70
(Continued)

FOREIGN PATENT DOCUMENTS

TW        200729016        8/2007
TW        M408732          8/2011

OTHER PUBLICATIONS

"Office Action of Taiwan Counterpart Application," dated May 17, 2019, p. 1-p. 5.

*Primary Examiner* — Vanessa Girardi
(74) *Attorney, Agent, or Firm* — JCIPRNET

(57) ABSTRACT

A key structure including a keycap, a bottom plate, a backlight module, and a thin film circuit board is provided. The bottom plate includes a body and a plurality of protrusions, wherein the body has a plurality of openings, and the protrusions protrude from a first surface of the body and are disposed around the openings. The backlight module is disposed on a second surface of the body, wherein the first surface and the second surface are opposite surfaces. The thin film circuit board and the keycap are disposed on the first surface of the body, and the thin film circuit board is located between the keycap and the bottom plate, and the protrusions are located within an orthographic projection range of the keycap.

15 Claims, 10 Drawing Sheets

(51) Int. Cl.
*G05G 1/02* (2006.01)
*G05G 25/00* (2006.01)
*G06F 1/16* (2006.01)

(52) U.S. Cl.
CPC .......... *G06F 1/1616* (2013.01); *G06F 1/1662* (2013.01); *H01H 2219/062* (2013.01); *H01H 2231/002* (2013.01)

(58) Field of Classification Search
CPC ....... H01H 2219/046; H01H 2219/062; G02B 6/0021; G02B 6/0011; G05G 25/00
See application file for complete search history.

(56) References Cited

U.S. PATENT DOCUMENTS

| | | | |
|---|---|---|---|
| 9,767,970 B2* | 9/2017 | Jhuang | H01H 13/023 |
| 10,340,098 B2* | 7/2019 | Pan | H01H 13/83 |

* cited by examiner

BACKLIT KEY STRUCTURE BOTTOM PLATE WITH SEPARATELY FORMED PROTRUSIONS

CROSS-REFERENCE TO RELATED APPLICATION

This application claims the priority benefits of U.S. provisional application Ser. No. 62/657,939, filed on Apr. 16, 2018, and China application serial no. 201910079620.1, filed on Jan. 28, 2019. The entirety of each of the above-mentioned patent applications is hereby incorporated by reference herein and made a part of this specification.

BACKGROUND

Field of the Invention

The invention relates to a key structure and more particularly, to a key structure capable of preventing light leakage.

Description of Related Art

Along with the development of technologies, many portable electronic apparatuses, such as notebook computers or personal digital assistants (PDAs), have been produced. Users use input devices, such as keyboards, mice and so on, to communicate with the electronic apparatuses.

However, in an environment with weak light, it may probably be difficult for a user to identify numerals and characters labeled on keys of a keyboard, resulting in difficulty of operations. Thus, a key structure capable of shining is launched to the market, which applies a backlight module capable of being applied to various electronic apparatuses in a keyboard module, so as to improve the input issue caused by insufficient ambient light.

However, due to the structure disposition of the keyboard module, the light emitted by the backlight module may likely leak from an assembly gap after elements are assembled, which may affect light uniformity, causing troubles in use to users.

SUMMARY

The invention provides a key structure capable of preventing light leakage and having light uniformity.

A key structure of the invention includes a keycap, a bottom plate, a backlight module and a thin film circuit board. The bottom plate includes a body and a plurality of protrusions. The body has a plurality of openings, and the protrusions protrude from a first surface of the body and are disposed around the openings. The backlight module is disposed on a second surface of the body. The first surface and the second surface are opposite surfaces. The thin film circuit board and the keycap are both disposed on the first surface of the body, and the thin film circuit board is located between the keycap and the bottom plate, and the protrusions are located within an orthographic projection range of the keycap.

In an embodiment of the invention, the body has a plurality of protrusion dispositioning ports, and the protrusions are correspondingly disposed in the protrusion dispositioning ports. A material of the protrusions is the same as or different from a material of the body.

In an embodiment of the invention, each of the protrusion dispositioning ports is separated from the corresponding one of the openings by a predetermined distance.

In an embodiment of the invention, the backlight module includes a light source and a light guide plate. The light source is disposed at a side of the light guide plate or in a through hole of the light guide plate.

In an embodiment of the invention, the backlight module includes a light source. The light source is disposed within the orthographic projection range of the keycap.

In an embodiment of the invention, the key structure further includes a rubber dome disposed between the thin film circuit board and the keycap and located within a range surrounded by the protrusions.

In an embodiment of the invention, the key structure further includes a supporting element disposed between the bottom plate and the keycap and located within a range surrounded by the protrusions.

A key structure of the invention includes a keycap, a bottom plate, at least one protrusion, a supporting element and a backlight module. The bottom plate is located below the keycap. The at least one protrusion is disposed on the bottom plate and extends toward the keycap, and an assembly region is defined by the least one protrusion. The supporting element is disposed on the bottom plate and located in the assembly region. The backlight module is disposed below the bottom plate.

In an embodiment of the invention, the at least one protrusion is located within an orthographic projection range of the keycap.

In an embodiment of the invention, the key structure further includes a thin film circuit board and a rubber dome, the thin film circuit board is disposed between the bottom plate and the keycap, and the rubber dome is disposed on the thin film circuit board.

In an embodiment of the invention, the bottom plate has a plurality of openings located in the assembly region.

In an embodiment of the invention, the bottom plate has a plurality of fixing portions disposed in the assembly region, and the supporting element is pivoted to the fixing portions.

In an embodiment of the invention, a surface of the at least one protrusion has a light absorbing material.

Based on the above, the disposition of the protrusions can preferably prevent the light emitted from the backlight module from leaking from a gap between the keycap and the bottom plate, so as to improve use convenience for users.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
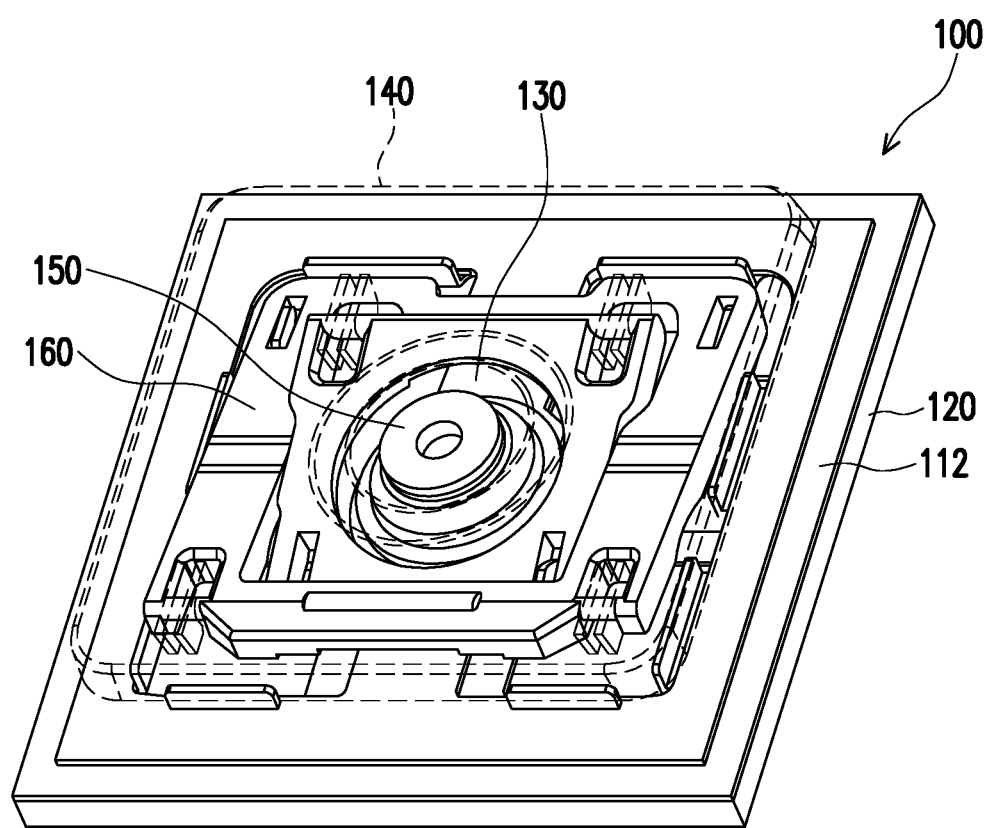
FIG. 1 is a schematic diagram illustrating an assembly of a key structure according to an embodiment of the invention.
Figure 2:
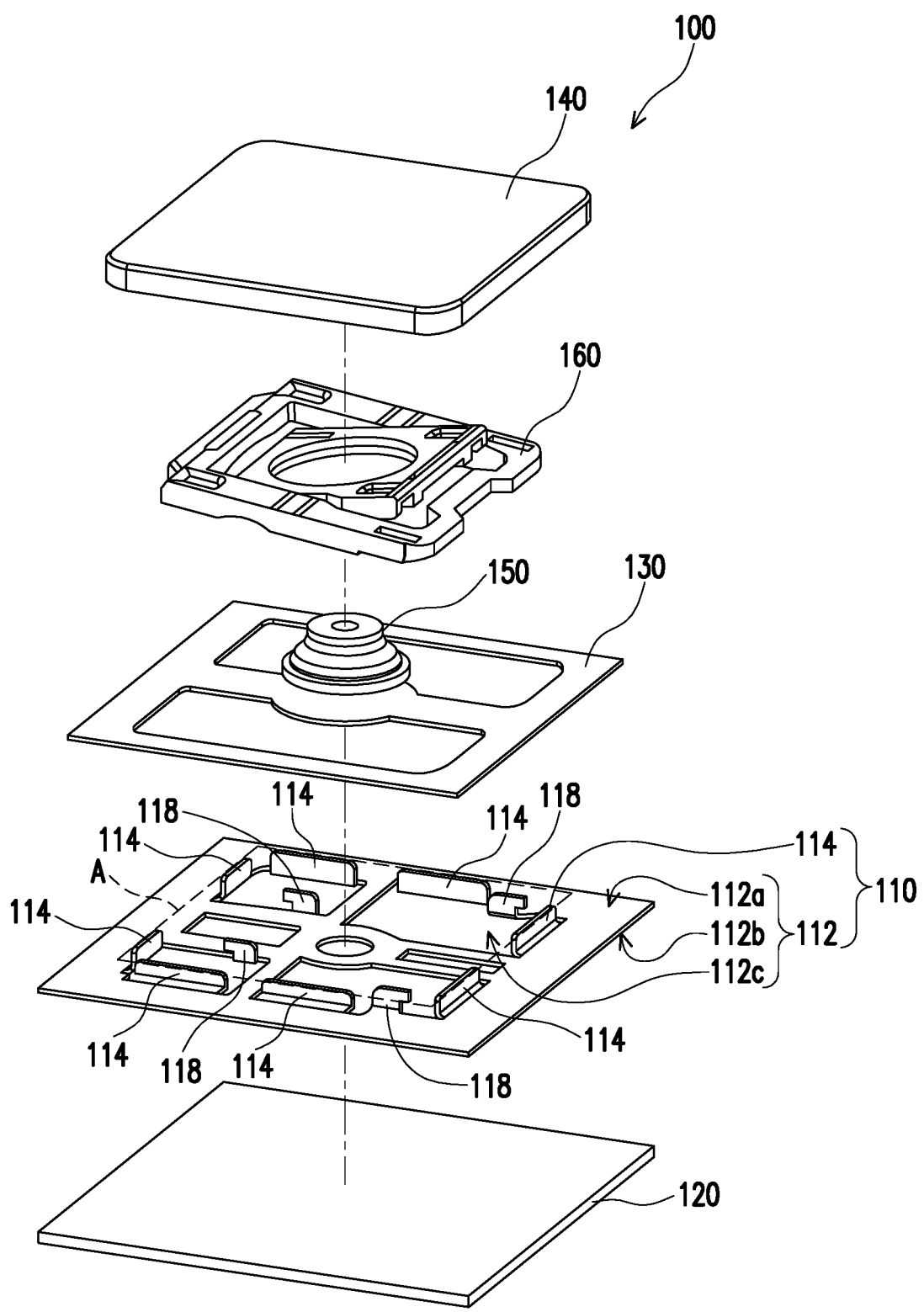
FIG. 2 is a schematic exploded diagram illustrating the key structure depicted in FIG. 1.

FIG. 1 is a schematic diagram illustrating an assembly of a key structure according to an embodiment of the invention. FIG. 2 is a schematic exploded diagram illustrating the key structure depicted in FIG. 1. Referring to both FIG. 1 and FIG. 2, a key structure 100 of the present embodiment includes a bottom plate 110, a backlight module 120, a thin film circuit board 130 and a keycap 140. The key structure 100 of the present embodiment is, for example, a key structure of a keyboard module and more particularly, a keyboard module applied in an electronic apparatus (e.g., a notebook computer).

The bottom plate 110 includes a body 112 and a plurality of protrusions 114. The body 112 has a first surface 112*a* and a second surface 112*b* which are opposite to each other and a plurality of openings 112*c* penetrating through the first surface 112*a* and the second surface 112*b*. The protrusions 114 protrude from the first surface 112*a* of the body 112 and extend toward the keycap 140 and are disposed in the periphery of the openings 112*c*. In the present embodiment, the protrusions 114 are disposed around the openings 112*c*. The backlight module 120 is on the second surface 112*b* of the body 112. The thin film circuit board 130 and the keycap 140 are both disposed on the first surface 112*a* of the body 112, and thin film circuit board 130 is located between the keycap 140 and the bottom plate 110. The protrusions 114 are located within an orthographic projection range of the keycap 140. In other words, when the keycap 140 is installed on the body 112 of the bottom plate 110, the protrusions 114 are located beneath the keycap 140.

Figure 7:
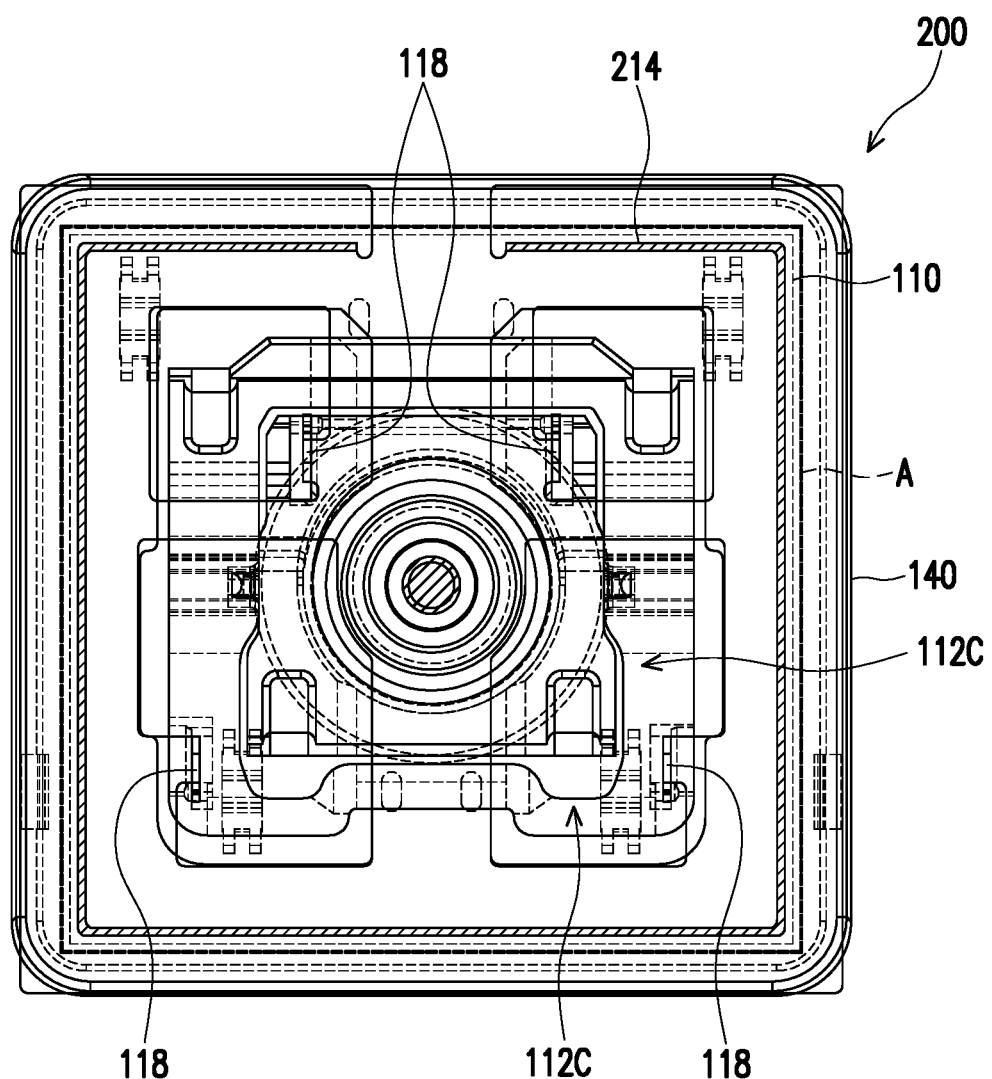
FIG. 7 is a schematic diagram illustrating a key structure according to another embodiment of the invention.

Following the above, the present embodiment takes the bottom plate 110 having multiple protrusions 114 as an example for description (as illustrated in FIG. 1). In other embodiments, the bottom plate 110 may has only one protrusion 114 (as illustrated in FIG. 7). Further, for the protrusions 114 of the present embodiment, the body 112 of the bottom plate 110 may be processed by means of, for example, punching, so as to form the plurality of openings 112*c* penetrating through the first surface 112*a* and the second surface 112*b*. In this way, the protrusions 114 and the body 112 are formed by processing the same sheet material, and thus, the protrusions 114 and the body 112 are made of the same material, and the protrusions 114 are disposed adjacent to the openings 112*c*. In addition, it is to be mentioned that in the present embodiment, each of the protrusions 114, in order to achieve a preferable light-shielding effect, protrudes, for example, the first surface 112*a* in a barrier-like manner from. In other words, each of the protrusions 114 itself does not have any through hole.

In other embodiments, the protrusions 114 may be fixed to the body 112 by means of post processing. For instance, edges surrounding the openings 112*c* are processed to form a plurality of protrusion dispositioning ports 116. Each of the protrusion dispositioning ports 116 is separated from the corresponding one of the openings 112*c* by a predetermined distance d. Then, the protrusions 114 are correspondingly disposed in the protrusion dispositioning ports 116. The aforementioned protrusion dispositioning ports 116 may be designed based on an actual requirement, for example, grooves which are recessed from the first surface 112*a* without penetrating through the second surface 112*b*, or alternatively, openings penetrating through the first surface 112*a* and the second surface 112*b*.

Figure 3:
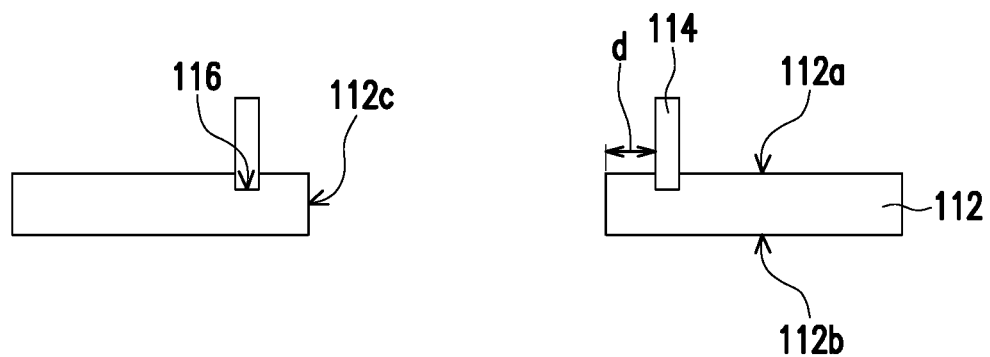
FIG. 3 is a schematic diagram illustrating that the protrusion dispositioning port is a groove, and the protrusion is disposed in the protrusion dispositioning port.

FIG. 3 is a schematic diagram illustrating that the protrusion dispositioning port is a groove, and the protrusion is disposed in the protrusion dispositioning port. Referring to FIG. 3, in the implementation manner as illustrated in FIG. 3, the protrusion dispositioning port 116 is a groove which is recessed from the first surface 112*a* without penetrating through the second surface 112*b*, while the protrusion 114 is disposed in the protrusion dispositioning port 116.

Figure 4:
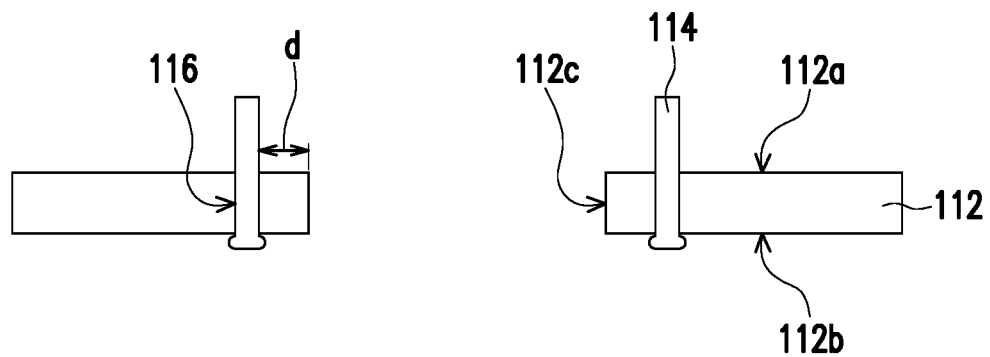
FIG. 4 is a schematic diagram illustrating that the protrusion dispositioning port is an opening, and the protrusion is disposed in the protrusion dispositioning port.

FIG. 4 is a schematic diagram illustrating that the protrusion dispositioning port is an opening, and the protrusion is disposed in the protrusion dispositioning port. Referring to FIG. 4, in the implementation manner as illustrated in FIG. 4, the protrusion dispositioning port 116 is an opening penetrating through the first surface 112*a* and the second surface 112*b*, and the protrusion 114, after being disposed in the protrusion dispositioning port 116, protrudes from the first surface 112*a*. Alternatively, the protrusion 114 is formed in the protrusion dispositioning port 116 by means of injection molding or in-mold molding.

According to FIG. 3 and FIG. 4, the design of a shape and a size of the protrusion dispositioning port 116 may be modified based on a demand, and a manner in which the protrusion 114 is assembled to or formed on the body 112 may be determined through the modification of the shape and the size of the protrusion dispositioning port 116. Then, in the implementation manners as illustrated in FIG. 3 and FIG. 4, a material selected for the protrusion 114 may be the same as a material of the body 112. For example, both the protrusion 114 and the body 112 may be made of metal, or alternatively, the material selected for the protrusion 114 may also be different from the material of the and body 112. For example, the body 112 is made of metal, while the protrusion 114 is made of plastic.

Even though the protrusion dispositioning port 116 is separated from the opening 112*c* by the predetermined distance d, a position that the protrusion dispositioning port 116 is disposed still falls within the orthographic projection range of the keycap 140. In this way, the protrusion 114 disposed in the protrusion dispositioning port 116 is still located within the orthographic projection range of the keycap 140 and covered by the keycap 140.

Figure 5A:
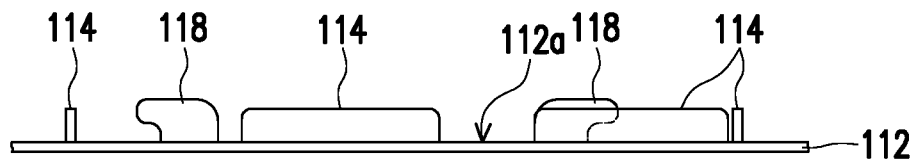
FIG. 5A through FIG. 5C are schematic diagrams illustrating different implementation aspects of the protrusions.
Figure 5B:
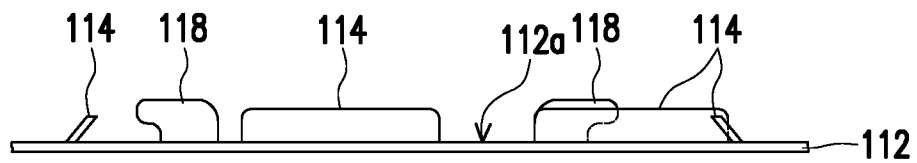
Figure 5C:
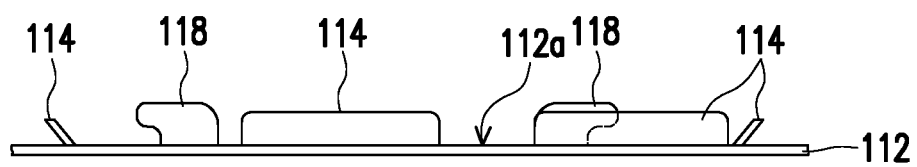

FIG. 5A through FIG. 5C are schematic diagrams illustrating different implementation aspects of the protrusions.

In addition, referring to FIG. 5A through FIG. 5C, the manner that the protrusions 114 extend toward the keycap 140 may vary with the consideration of a light state or an overall key design of the backlight module 120. For example, the protrusions 114 extend toward the keycap 140 in a direction substantially vertical to the first surface 112*a* (as illustrated in FIG. 5A), or alternatively, the protrusions 114 extend toward the keycap 140 in a direction forming an acute angle with respect to the first surface 112*a* of the body 112 (as illustrated in FIG. 5B) or an obtuse angle with respect to the first surface 112*a* of the body 112 (as illustrated in FIG. 5C). Certainly, the extension manner of the protrusions 114 may be an arbitrary combination selected from the extension manners described above. In other words, the protrusions 114 may be adaptively modified in the shape and the extension direction based on a demand, without being limited to those exhibited in the present embodiment.

Figure 6A:
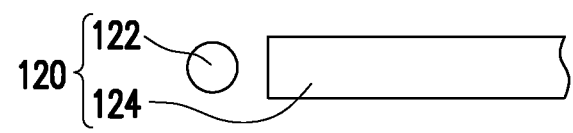
FIG. 6A through FIG. 6C are schematic diagrams illustrating different implementation aspects of the backlight module.
Figure 6B:
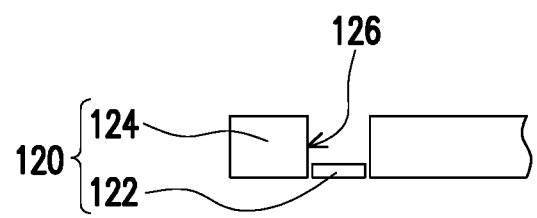
Figure 6C:
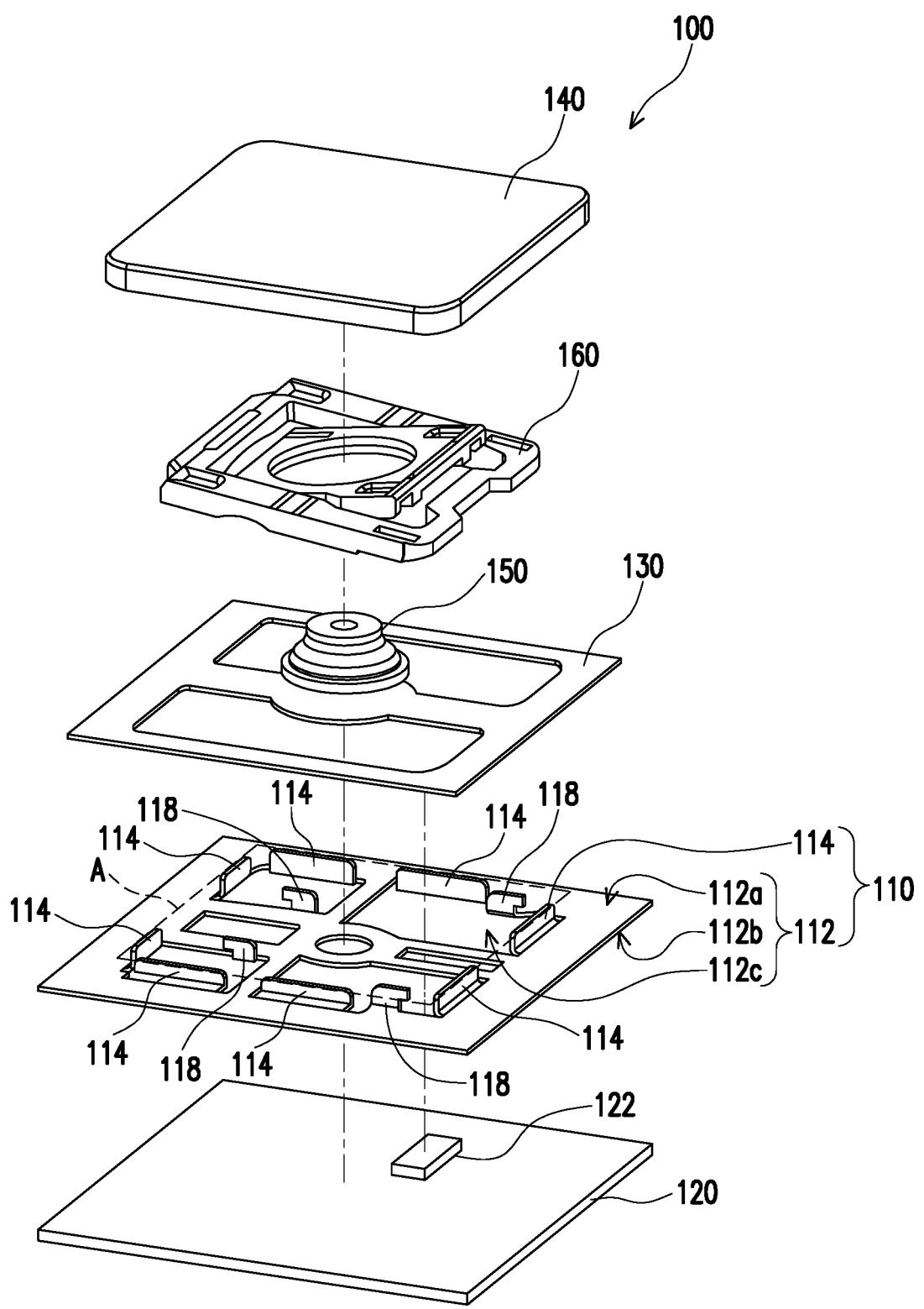

FIG. 6A through FIG. 6C are schematic diagrams illustrating different implementation aspects of the backlight module. As illustrated in FIG. 6A, the backlight module 120 includes a light source 122 and a light guide plate 124, and the light source 122 is disposed at a side of the light guide plate 124. Further, as illustrated in FIG. 6B, the backlight module 120 includes a light source 122 and a light guide plate 124, and the light source 122 is disposed in a through hole 126 of the light guide plate 124. Moreover, as illustrated in FIG. 6C, the backlight module 120 has a light source 122, and the light source 122 is disposed within the orthographic projection range of the keycap 140. In other words, the backlight module 120 may be one selected from a side-type backlight module or a direct-type backlight module. Additionally, the light source 122 in the backlight module 120 may be one selected from a light emitting diode (LED), a Mini LED, a Micro LED or an organic LED (OLED) or a combination thereof based on a demand.

Continuously referring to FIG. 1 and FIG. 2, the key structure 100 further includes a rubber dome 150 and a supporting element 160. In the present embodiment, the rubber dome 150 is disposed between the thin film circuit board 130 and the keycap 140, the supporting element 160 is pivoted to a plurality of fixing portions 118 of the bottom plate 110 and is located between the bottom plate 110 and the keycap 140, and the supporting element 160 surrounds the rubber dome 150. Furthermore, an assembly region A is defined by a range surrounded by the protrusions 114, and the rubber dome 150 and the supporting element 160 are located within the assembly region A.

When a user uses the key structure 100, the light emitted by the backlight module 120, after passing from the underneath of the body 112 of the bottom plate 110 and passing through the openings 112c of the body 112 and thin film circuit board 130, irradiates on the keycap 140, such that the user may recognize a character printed on the keycap 140 clearly and easily.

Specifically, since the keycap 140 covers the protrusions 114 from the top, a gap between the keycap 140 and the bottom plate 110 is shielded by the protrusions 114, and thus, the light may be prevented from leaking from the gap between the keycap 140 and the bottom plate 110, so as to prevent the user from being affected by the light leakage when recognizing the character printed on the keycap 140.

It should be mentioned that in the specification, the bottom plate 110, the backlight module 120 and thin film circuit board 130 are presented as being sliced into unit bodies in a manner for fitting the keycap 140 in the illustration for descriptive convenience, however, people of the art may be of the knowledge that the bottom plate 110, the backlight module 120 and thin film circuit board 130 as described above are usually presented in a manner that these unit bodies are integrated to form a sheet material or a plate material simultaneously corresponding to a plurality of keycaps 140.

Referring to FIG. 7, it is a schematic diagram illustrating a key structure according to another embodiment of the invention, and comparing with the key structure 100 illustrated in FIG. 1, the difference between a key structure 200 illustrated in FIG. 7 and the key structure 100 is in the key structure 200 having only one protrusion 214. In the present embodiment, the protrusion 214 is disposed on the bottom plate 110, extends toward the keycap 140 and is located within the orthographic projection range of the keycap 140, and an assembly region A is defined by the protrusions 214. The fixing portions 118 and the openings 112c of the bottom plate 110 and the supporting element 160 are all located inside the assembly region A surrounded by the protrusion 214.

Figure 8:
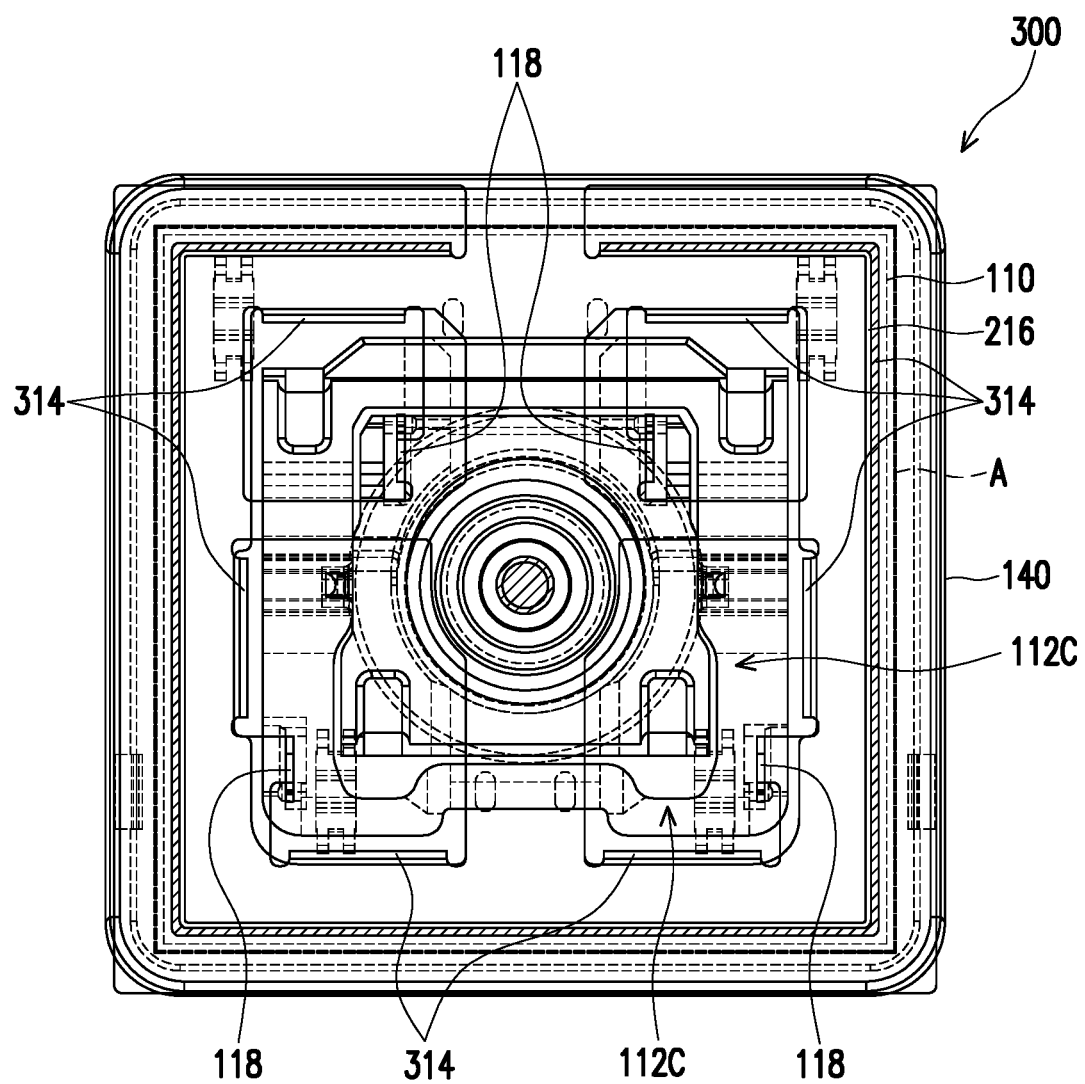
FIG. 8 is a schematic diagram illustrating a key structure according to yet another embodiment of the invention.

Referring to FIG. 8, it is a schematic diagram illustrating a key structure according to yet another embodiment of the invention, and in a key structure 300 illustrated in FIG. 8, there are further a plurality of protrusions 314 in the assembly region A surrounded by the protrusion 214. In other words, the protrusions 214 and 314 surround the openings 112c of the bottom plate in a disposition relationship as an inner ring and an outer ring. In addition, in the present embodiment, an example that a light absorbing material 216 is further disposed on a surface of the protrusion 214 is taken for description, while in other implementation aspects, a light absorbing material may be coated on surfaces of a plurality of protrusions, a surface of a protrusion at a specific position or a surface of a plurality of protrusions at specific positions based on a demand, so as to improving an effect of preventing the light leakage.

Figure 9:
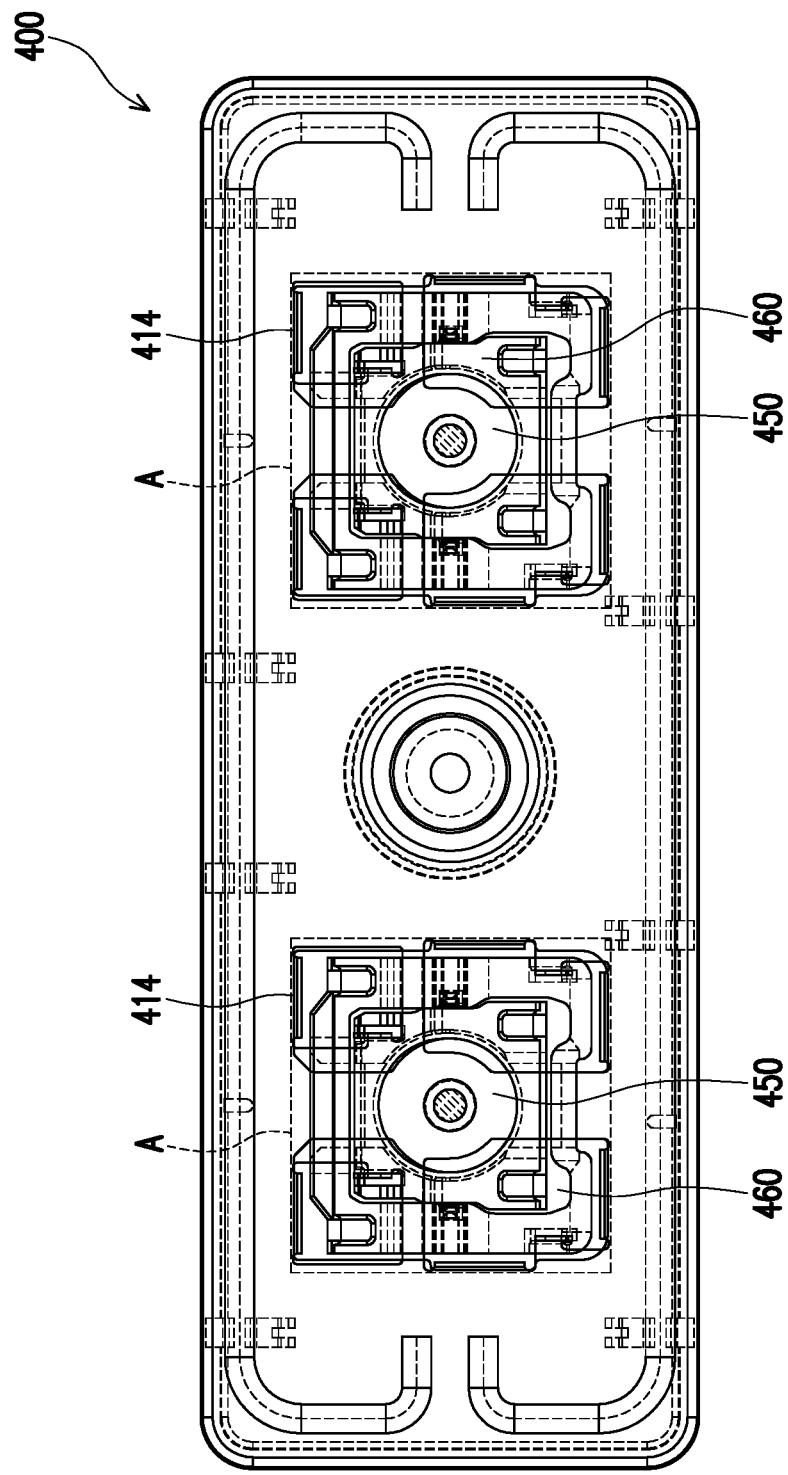
FIG. 9 is a schematic diagram illustrating a key structure according to still another embodiment of the invention.

Then, referring to FIG. 9, it is a schematic diagram illustrating a key structure according to still another embodiment of the invention. A key structure 400 illustrated in FIG. 9 is a multiple-width key, such as space key, Shift key, Enter key . . . etc. In the present embodiment, the key structure 400 has a plurality of protrusions 414, and the protrusions 414 are grouped into two groups, an assembly region A is defined by each of the groups, and a supporting element 460 is disposed in each of the assembly regions A. Next, a rubber dome 450 is located between the two supporting elements 460.

In view of the foregoing, in the key structure of the invention, through the disposition of the protrusions, the gap between the keycap and the bottom plate can be shielded by the protrusions, such that the light emitted from the backlight module can be preferably prevented from leaking from the gap between the keycap and the bottom plate. Therefore, for the user, the character printed on the keycap can be recognized more clearly and conveniently, so as to improve the convenience in use.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A key structure, comprising:
a keycap;
a bottom plate, comprising a body and a plurality of protrusions, wherein the body has a plurality of openings, and the protrusions protrude from a first surface of the body and are disposed around the openings;
a supporting element, disposed on the bottom plate;
a backlight module, disposed on a second surface of the body, wherein the first surface and the second surface are opposite surfaces; and
a thin film circuit board, disposed on the first surface of the body and located between the keycap and the bottom plate,
wherein the protrusions are located within an orthographic projection range of the keycap, and the protrusions do not contact the supporting element.

2. The key structure according to claim 1, wherein a material of the protrusions is the same as a material of the body.

3. The key structure according to claim 1, wherein a material of the protrusions is different from a material of the body.

4. The key structure according to claim 1, wherein the backlight module comprises a light source and a light guide plate, wherein the light source is disposed at a side of the light guide plate or in a through hole of the light guide plate.

5. The key structure according to claim 1, wherein the backlight module comprises a light source, which is disposed within the orthographic projection range of the keycap.

6. The key structure according to claim 1, further comprising a rubber dome disposed between the thin film circuit board and the keycap and located within a range surrounded by the protrusions.

7. The key structure according to claim 1, wherein the supporting element is located within a range surrounded by the protrusions.

8. The key structure according to claim 1, wherein the body has a plurality of protrusion dispositioning ports, and the protrusions are correspondingly disposed in the protrusion dispositioning ports.

9. The key structure according to claim 8, wherein each of the protrusion dispositioning ports is separated from the corresponding one of the openings by a predetermined distance.

10. A key structure, comprising:
a keycap;
a bottom plate located below the keycap, comprises at least one opening;
at least two protrusions, disposed around the bottom plate opening and extending toward the keycap, and an assembly region being defined by the protrusions;
a supporting element, disposed on the bottom plate and located inside the assembly region; and
a backlight module, disposed below the bottom plate;
wherein the protrusions do not contact the supporting element.

11. The key structure according to claim 10, wherein the at least one protrusion is located within an orthographic projection range of the keycap.

12. The key structure according to claim 10, further comprising a thin film circuit board and a rubber dome, the thin film circuit board is disposed between the bottom plate and the keycap, and the rubber dome is disposed on the thin film circuit board.

13. The key structure according to claim 10, wherein the bottom plate has a plurality of openings located in the assembly region.

14. The key structure according to claim 10, wherein the bottom plate has a plurality of fixing portions disposed in the assembly region, and the supporting element is pivoted to the fixing portions.

15. The key structure according to claim 10, wherein a surface of the at least one protrusion has a light absorbing material.

* * * * *